United States Patent [19]

Nagano

[11] Patent Number: 4,896,557
[45] Date of Patent: Jan. 30, 1990

[54] SPEED-CHANGE LEVER DEVICE FOR A BICYCLE

[75] Inventor: Masashi Nagano, Osaka, Japan

[73] Assignee: Shimano Industrial Company Limited, Osaka, Japan

[21] Appl. No.: 577,894

[22] Filed: Feb. 7, 1984

[30] Foreign Application Priority Data

Feb. 15, 1983 [JP] Japan ............... 58-21395[U]
Jun. 14, 1983 [JP] Japan ............... 58-91344[U]

[51] Int. Cl.⁴ ............................................. G05G 5/06
[52] U.S. Cl. ..................................... 74/531; 74/489; 74/502.2
[58] Field of Search ................ 74/501 R, 531, 489

[56] References Cited

U.S. PATENT DOCUMENTS

| 3,693,469 | 9/1972 | Ozaki | 74/531 |
| 3,915,029 | 10/1975 | Shimada | 74/531 |
| 4,046,025 | 9/1977 | Ozaki | 74/489 |
| 4,223,563 | 9/1980 | Kine | 74/501 |
| 4,434,679 | 3/1984 | Shimano | 74/531 |
| 4,437,357 | 3/1984 | Ozaki et al. | 74/531 |
| 4,454,784 | 6/1984 | Shimano | |

FOREIGN PATENT DOCUMENTS

| 0053776 | 6/1982 | European Pat. Off. |
| 1035503 | 7/1958 | Fed. Rep. of Germany |
| 1976860 | 7/1967 | Fed. Rep. of Germany |
| 2490175 | 3/1982 | France |
| 57-128589 | 10/1982 | Japan |
| 10651 | of 1914 | United Kingdom ........... 74/501 |

Primary Examiner—Rodney M. Lindsey
Attorney, Agent, or Firm—Stevens, Davis, Miller & Mosher

[57] ABSTRACT

A speed-change lever device for a bicycle in which a boss of an operating lever is rotatably supported to a lever shaft, and in which a friction plate is supported to an eccentric portion of the lever shaft to give a resistance against rotation of the operating lever. An urging member is provided having a not-round through bore by which it is fitted onto the not-round portion of the lever shaft. A screw member is provided to engage with screw threads in the lever shaft forwardly or backwardly to adjust thereby a rotational resistance given to the lever through the urging member. The urging member includes an urging portion for urging the friction plate toward the boss of the operating lever through a forward screw-movement of the screw member during assembly. The friction plate has engaging segments which, when urged by the urging portion of the urging member during assembly, are elastically deformed to engage with the not-round portion of the lever shaft, whereby a frictional resistance between the boss of the operating lever and the friction plate prevent the urging member from rotating together with the operating lever.

6 Claims, 4 Drawing Sheets

SPEED-CHANGE LEVER DEVICE FOR A BICYCLE

FIELD OF THE INVENTION

This invention relates to a speed-change lever device for a bicycle, and more particularly, to a speed-change lever device for a bicycle, which is provided with an operating lever, a friction plate for giving a resistance against rotation of the operating lever, an urging member for urging the friction plate against the operating lever, and a screw member for adjusting the rotational resistance against the operating lever, so that the lever is operated to actuate a derailleur mounted to the bicycle and to maintain the speed-change position obtained by the derailleur.

BACKGROUND OF THE INVENTION

Generally, bicycle speed-change lever devices comprise a lever shaft having a round portion, a not-round portion, and a threaded bore; an operating lever supported rotatably to the round portion at the lever shaft, a friction plate elastically deformable to give a resistance against the rotation the operating lever, an urging member for urging the friction plate and having a not-round through-bore through which it is fitted onto the not-round portion at the lever shaft, andc a screw member which screws with the screw thread the lever shaft and urges the urging member to give the rotational resistance to the lever. In detail, the operating lever is rotatably supported at the boss thereof to the round portion of the lever shaft, and the friction plate is inserted onto the not-round portion of the lever shaft, the urging member is fitted at its not-round through bore onto the not-round portion of the lever shaft and the screw member screws with the threaded bore at the lever shaft, as a result the screw member screws forwardly or backwardly to adjust the rotational resistance given to the operating lever.

The urging member has a not-round through bore slightly larger in sectional area than the not-round portion of the lever shaft to thereby be easy to fit thereon. Hence, when the urging member is fitted onto the lever shaft, a slight gap is developed between the inner periphery of the not-round through bore at the urging member and the outer periphery of the not-round portion at the lever shaft. As a result, the urging member, when the operating lever is operated, will rotate together with the friction plate a small amount with respect to the lever shaft through the aforesaid rotational resistance in a range defined by the above-described gap. Such rotation of the urging member is repeated several times, resulting in the screw member becoming loose and the friction plate having a reduced urging force, so that not only the rotational resistance given to the operating lever may be reduced but also the operating lever may become loose with respect to the lever shaft, thereby creating a problem of lowering the operability the speed-change lever device.

SUMMARY OF THE INVENTION

An object of the invention is to provide at the friction plate engaging segments elastically deformable when urged by the urging member, with the engaging segments engaging with the not-round portion of a lever shaft so that the urging member is restrained through friction plate from the rotation with respect to the lever shaft, thereby preventing the screw member from becoming loose.

The speed-change lever device of the invention is so constructed that the urging member is provided with an urging portion which contacts with the friction plate by the forwrd screw-movement of the screw member and also elastically deforms the friction plate to urge it toward the boss of the operating lever. The friction plate is provided with engaging segments which are elastically deformable when urged by the urging portion of the urging member, and which are engageable with the not-round portion of the lever shaft to thereby make the friction plate not-rotatable, whereby the urging member is adapted to be restrained from rotation through the friction plate and frictional resistance between the friction plate and the urging member.

Hence, in this invention, since the urging member is not rotatable with respect to the lever shaft when the operating lever is operated, even when the operating lever repeats its turn, the urging member can reliably be prevented from becoming loose.

The above and further objects and features of the invention will be more fully apparent from the following detailed description when the same is read in connection with the accompanying drawings.

BRIEF DESCRIPTION OF THE DRAWINGS

FIG. 4 is a sectional view taken on the line IV—IV in FIG. 3, FIGS. 5 through 11 show a modified embodiment of the invention, in which

DETAILED DESCRIPTION OF THE INVENTION

Figure 1:
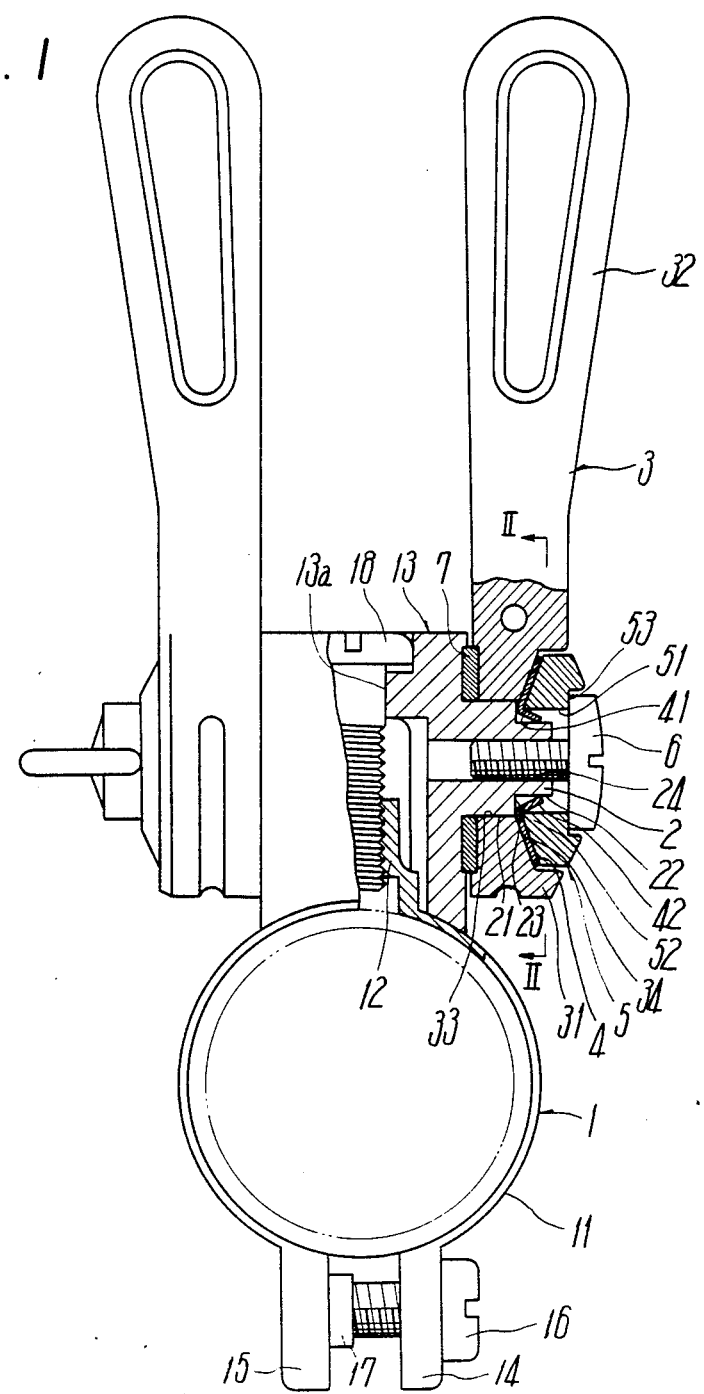
FIG. 1 is a longitudinal sectional view of an embodiment of a speed-change lever device of the invention.
Figure 2:
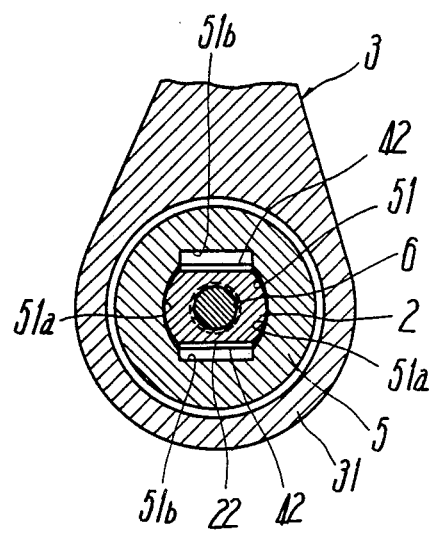
FIG. 2 is a sectional view taken on the line II—II in FIG. 1.

The speed-change lever device of the invention basically comprises a lever shaft 2 fixed to a fixing member 1, an operating lever 3 supported rotatably to the lever shaft 2, a friction plate 4 for giving a resistance against rotation of the operating lever 3, and urging member 5 which urges the friction plate 4 toward lever shaft 2 and operating lever 3, and a screw member 6 for adjusting the rotational resistance given to the operating lever 3.

The fixing member 1, as shown in FIG. 1, comprises a tightening band 11 of about C-like shape and having an internally threaded cylinder 12 and a cylindrical support 13 having a through bore 13a. Tightening band 11 is provided at both ends with a pair of mounting tongues 14 and 15 so that one tongue 14 supports a tightening bolt 16 and the other tongue 15 has an internally threaded cylinder 17 integral therewith. The tightening bolt 16 screws with the threaded cylinder 17 to thereby fix the tightening band 11 to the bicycle frame, for example, a top tube, and a mounting bolt 18 is inserted through the bore 13a and screws with the threaded cylinder 12 to thereby tighten the support 13 to the tightening band 11.

The lever shaft 2 projects integrally from one side of support 13 and is provided at the outer periphery of the root with a portion 21 round in section. Shaft 2 includes at the outer periphery of an axial end portion, a portion 22 not-round in section and having circular-arc faces and flat faces. Shaft 2 includes shoulders 23, and at its center a threaded bore 24. Alternatively, the lever shaft 2 may be integral with the tightening band 11, or separate from the support 13 or tightening band 11 to thereby be fixed thereto.

The operating lever 3 has a boss 31 and a control 32, the boss 31 having at the center a shaft bore 33 to be fitted rotatably onto the round portion 21 of lever shaft 2.

The friction plate 4 uses a elastic disc to be discussed below and is provided at the center with a not-round through bore 41 into which the not-round portion 22 of lever shaft 2 is inserted. The urging member 5 is formed mainly of synthetic resin and is cylindrical, having at the center a a not-round through bore 51 receiving therein the not-round portion 22 at the lever shaft 2. The screw member 6 comprises a headed bolt and is supported at the head to the urging member 5. Member 6 is inserted at a threaded portion through the bore 51 at the urging member 5 to screw with the threaded bore 24 at the lever shaft 2, thereby screwing forwardly to urge the friction plate 4 through the urging member 5 and giving a resistance against the rotation of operating lever 3.

The speed-change lever device of the invention constructed as abovementioned is provided at the urging member 5 with an urging portion 52 which comes into contact with the friction plate 4 through a forward screw-movement of screw member 6 to elastically deform the friction plate 4 and urge it toward the boss 31 of operating lever 3. The device also includes at the friction plate 4 engaging segments 42 which are elastically deformed when urged by the urging portion 52 and engage with the not-round portion 22 at the lever shaft 2 to thereby make the friction plate 4 not-rotatable. Thus, the friction plate 4 restrains the urging member 5 from rotating with respect to the lever shaft 2.

The friction plate 4 employs an elastic metal plate, such as a tool steel plate, of about 0.6 m/m in thickness and press-molded into annular shape, and two engaging segments 42 are molded integrally with the inner periphery of friction plate 4 in relation of projecting axially thereof and being opposite to each other. Also, the not-round through bore 41 at the friction plate 4 has circular-arc faces 41a and flat faces 41b provided with the engaging segments 42 respectively. Alternatively, there may be one or three or more engaging segments 42.

Also, the urging member 5 molded cylindrical and of synthetic resin as aforesaid is provided at the inside surface with the urging portion 52 formed during the molding and at the axially outside surface with an engaging recess 53 engageable with the head of screw member 6. Urging portion 52, for example, may be formed of the axially inside surface of urging member 5 so as to slope axially inwardly from the outer periphery to the center thereof.

The operating lever 3 is provided at the outside surface of boss 31 opposite to the urging member 5 with a friction surface 34 sloping axially inwardly toward the center of boss 31 so that the friction surface 34 abuts against the friction plate 4. In addition, reference numeral 7 designates a washer.

Figure 3:
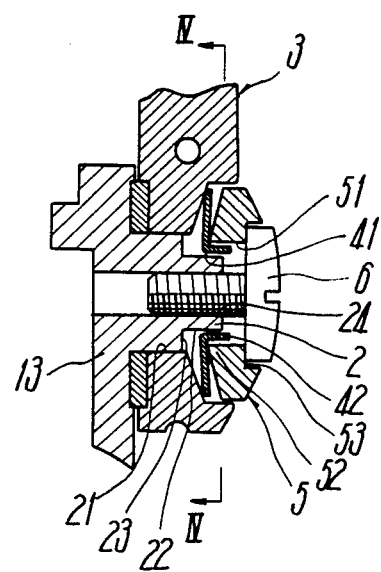
FIG. 3 is a sectional view explanatory of the principal portion of the FIG. 1 embodiment, in which a screw member is shown prior to being tightened to a lever shaft.
Figure 4:
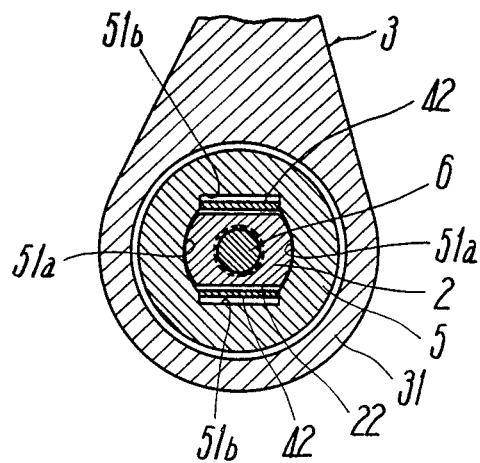
Figure 5:
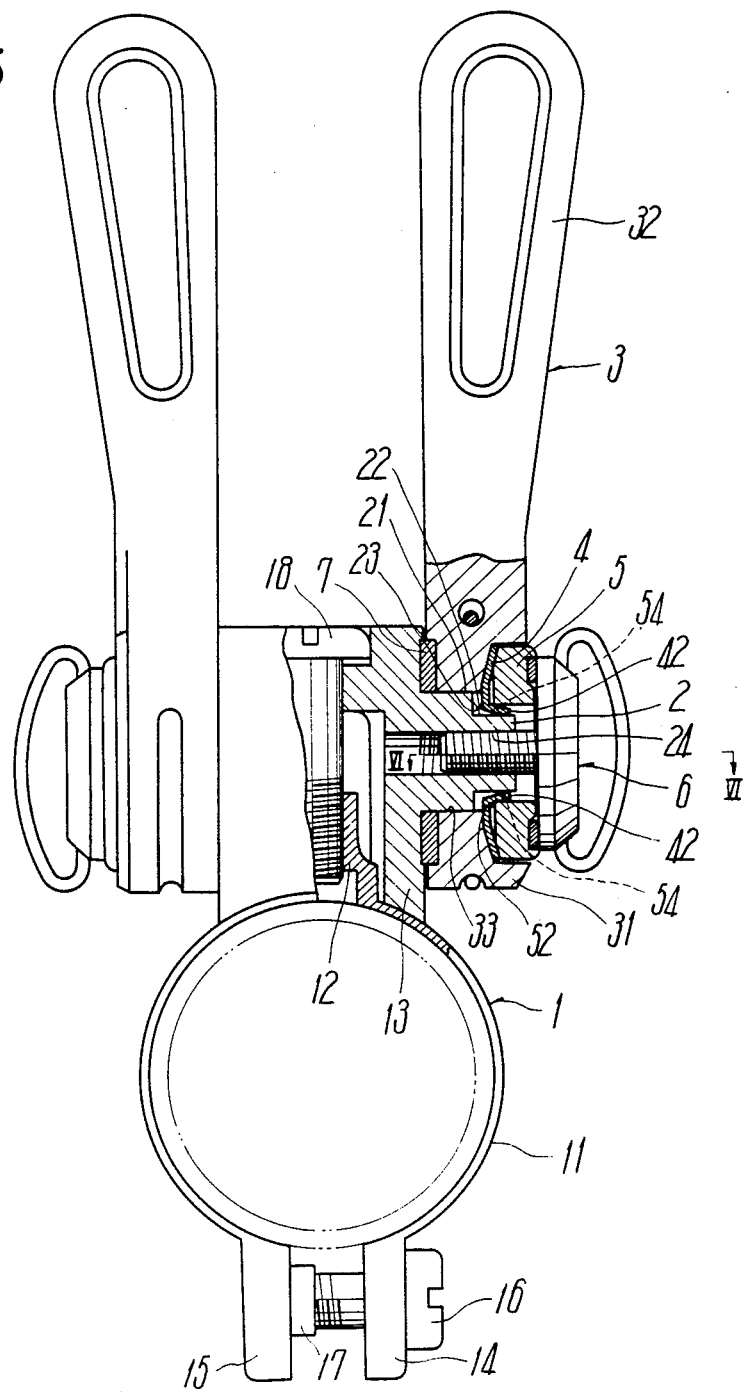
FIG. 5 is a longitudinal sectional view of the modified embodiment.
Figure 6:
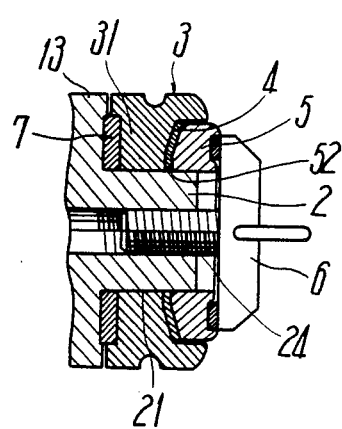
FIG. 6 is a sectional view taken on the line VI—VI in FIG. 5.
Figure 7:
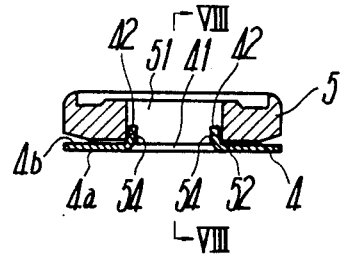
FIG. 7 is a sectional view of a friction plate supported to an urging member.
Figure 8:
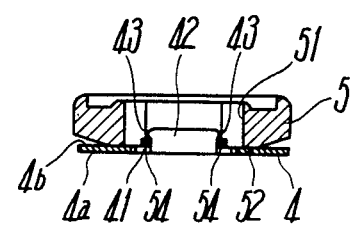
FIG. 8 is a sectional view taken on the line VIII—VIII in FIG. 7.

The operating lever 3, as shown in FIG. 3, is fitted at the shaft bore 33 at the boss 31 rotatably onto the round portion 21 at the lever shaft 2. Friction plate 4 is fitted onto the not-round portion 22 at the lever shaft 2 from the outside of boss 31. Urging member 5 is fitted at the not-round through bore 51 onto the not-round portion 22 at the lever shaft 2 from the outside of friction plate 4. Screw thread portion of screw member 6 is inserted into the through bore 51 and screws with the thread bore 24. Thus, the operating lever 3 is supported to the lever shaft 2.

When the screw member 6 screws forwardly, the thrust thereof acts on the friction plate 4 through the urging portion 52 at the urging member 5 and the friction plate 4 is elastically deformed into a circular cone, so that the engaging segments 42 are displaced from the position shown in FIG. 3 toward the center of lever shaft 2 as shown in FIG. 1 to engage with the not-round portion 22 respectively. Hence, the friction plate 4 is restrained from rotation with respect to the lever shaft 2, whereby the operating lever 3 is given the resistance against its rotation. Also, the urging member 5 is restrained from rotation against the lever shaft 2 through the friction plate 4 and through frictional resistance between the friction plate 4 and the urging member 5, whereby the screw member 6 can reliably be prevented from being loosened due to its rotating together with the urging member 5. Accordingly, even when the operating lever 3 repeats its rotation, the screw member 6 is prevented from becoming loose.

Alternatively, a holding mechanism may, as shown in FIGS. 5 through 11, be interposed between the urging member 5 and the friction plate 4, thereby holding the friction plate 4 to the urging member 5 in one unit.

Figure 11:
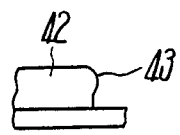
FIG. 11 is an enlarged view of an engaging projection at each engaging segment of the friction plate.

The holding mechanism comprises engaging projections 43 provided at one of the urging member 5 and friction plate 4 and also comprises engageable portions 54 provided at the other and of member 5 and plate 4 for engagement with the engaging projections 43 respectively. In the drawings, the engaging projections 43 are provided at both sides of the utmost ends of engaging segments 42 at the friction plate 4 and are, for example, semi-circular as shown in FIG. 11 respectively. Engaging portions 54 are provided at one axial end of not-round through bore 51 at the urging member 5 and at the corners between the circular-arc faces 51a and the flat faces 51b of the same respectively, as shown in FIGS. 7 to 10.

Figure 9:
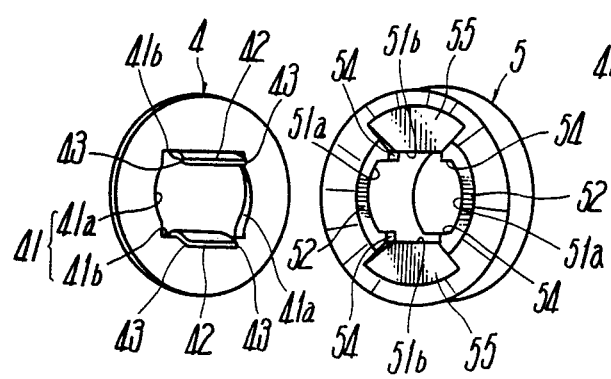
FIG. 9 is a perspective exploded view of the friction plate and urging member.
Figure 10:
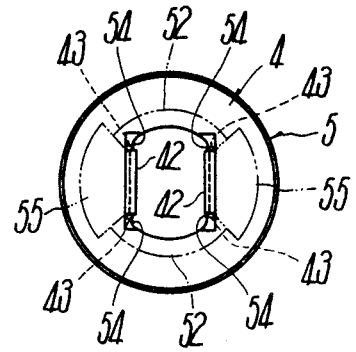
FIG. 10 is a bottom view of the friction plate coupled with the urging member, corresponding to FIG. 7.

Also, at the urging portion 52 at the urging member 5, two not-urging portions 55, as shown in FIG. 9, are provided which extend from the flat faces 51b toward the outer periphery so that urging portions 52 disposed between the not-urging portions 55 urge the friction plate 4 and deflect it into a circular cone.

The urging member 5 and friction plate 4 in one unit as abovementioned can be handled as one part with simplified part management and can be free from a shift of friction plate 4 from the urging member 5 to thereby facilitate assembly with improved assembly efficiency. Also, there is much less risk of losing the friction plate 4 during the dismantling for inspection or repair.

Alternatively, the friction plate 4 may be formed of a composite material of synthetic resin or asbestos fiber.

As seen from the above, the speed-change lever device of the invention constructed as abovementioned can reliably prevent the screw member from becoming loose even when the operating lever repeats its operation, thereby enabling the operating lever to be kept in a condition of having proper rotational resistance and to have its play with respect to the lever shaft eliminated, thus keeping good operability.

Although several embodiments have been described, they are merely exemplary of the invention and not to be construed as limiting, the invention being defined solely by the appended claims.

What is claimed is:

1. A speed-change lever device for a bicycle, comprising:
    (a) a lever shaft having a round portion and a not-round portion, said lever shaft having a screw thread at an axial end thereof;
    (b) an operating lever supported rotatably on said round portion of said lever shaft, said operating lever including a boss;
    (c) an elastically deformable friction plate supported on said not-round portion of said lever shaft for providing resistance against rotation of said lever;
    (d) an urging member having a not-round through bore through which said urging member is fitted onto said not-round portion of said lever shaft for urging said friction plate against said operating lever and said lever shaft; and
    (e) a screw member screwable with said screw thread of said lever shaft, whereby said screw member can be screwed forwardly or backwardly to adjust a rotational resistance provided against said lever by said friction plate, said urging member having an urging portion for contacting said friction plate as a result of a forward screw-movement of said screw member during assembly of said lever device to thereby elastically deform said friction plate to urge said friction plate toward said boss of said operating lever, said friction plate including at least one engaging segment which, when urged by said urging portion of said urging member during assembly of said lever device, is elastically deformed to engage with said not-round portion of said lever shaft leaving substantially no gap thereбеween to thereby make said friction plate not-rotatable, said engaging segment being inclined relative to an axial dimension of said lever shaft and deformed elastically along said axial dimension as a result of urging of said friction plate by said urging member toward said boss, an utmost end portion of said engaging segment being in contact with an outer face of said not-round portion of said lever shaft.

2. A speed-change lever device for a bicycle according to claim 1, wherein an outside surface of said boss of said operating lever disposed opposite to said urging member is inclined axially inwardly toward a center of said lever shaft, said urging portion of said urging member being inclined toward a center of said lever shaft.

3. A speed-change lever device for a bicycle according to claim 1, wherein a holding mechanism for holding said friction plate to said urging member is positioned between said urging member and said friction plate.

4. A speed-change lever device for a bicycle, comprising:
    (a) a lever shaft having a round portion and a not-round portion, said lever shaft having a screw thread at an axial end thereof;
    (b) an operating lever supported rotatably on said round portion of said lever shaft, said operating lever including a boss;
    (c) an elastically deformable friction plate supported on said not-round portion of said lever shaft for providing resistance against rotation of said lever shaft;
    (d) an urging member having a non-round through bore through which said urging member is fitted onto said not-round portion of said lever shaft for urging said friction plate against said operating lever and said lever shaft;
    (e) a screw member screwable with said screw thread of said lever shaft, whereby said screw member can be screwed forwardly or backwardly to adjust a rotational resistance provided against said lever by said friction plate, said urging member having an urging portion for contacting said friction plate as a result of a forward screw-movement of said screw member during assembly of said lever device to thereby elastically deform said friction plate to urge said friction plate toward said boss of said operating lever, said friction plate including at least one engaging segment which, when urged by said urging portion of said urging member during assembly of said lever device, is elastically deformed to engage with said not-round portion of said lever shaft leaving substantially no gap therebetween to thereby make said friction plate not-rotatable; and
    (f) a holding mechanism for holding said friction plate to said urging member, said holding mechanism being disposed between said urging member and said friction plate, said holding mechanism comprising engaging projections on said friction plate and engaging portions on said urging member engageable with said engaging projections.

5. A speed-change lever device for a bicycle according to claim 4, wherein said engaging projections are located on said at least one engaging segment of said friction plate, said engaging portions being positioned at an end portion of said not-round through bore of said urging member.

6. A speed-change lever device for a bicycle, comprising:
    (a) a lever shaft having a round portion and a not-round portion, said lever shaft having a screw thread at an axial end thereof;
    (b) an operating lever supported rotatably on said round portion of said lever shaft, said operating lever including a boss;
    (c) an elastically deformable friction plate supported on said not-round portion of said lever shaft for providing resistance against rotation of said lever shaft;
    (d) an urging member having a not-round through bore through which said urging member is fitted onto said not-round portion of said lever shaft for urging said friction plate against said operating lever and said lever shaft;
    (e) a screw member screwable with said screw thread of said lever shaft, whereby said screw member can be screwed forwardly or backwardly to adjust a rotational resistance provided against said lever by said friction plate, said urging member having an urging portion for contacting said friction plate as a result of a forward screw-movement of said screw member during assembly of said lever device to thereby elastically deform said friction plate to urge said friction plate toward said boss of said operating lever, said friction plate including at least one engaging segment which, when urged by said urging portion of said urging member during assembly of said lever device, is elastically deformed to engage with said not-round portion of said lever shaft leaving substantially no gap therebetween to thereby make said friction plate not-rotatable; and (f) a holding mechanism for holding said friction plate to said urging member, said holding mechanism being disposed between said urging member and said friction plate, said holding mechanism comprising engaging projections on said urging member and engaging portions on said friction plate engageable with said engaging projections.

* * * * *